(12) United States Patent
Doerr et al.

(10) Patent No.: US 7,409,121 B2
(45) Date of Patent: Aug. 5, 2008

(54) INTEGRATEABLE OPTICAL INTERLEAVER AND DE-INTERLEAVER

(75) Inventors: Christopher Richard Doerr, Middletown, NJ (US); David S. Levy, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/565,338

(22) Filed: Nov. 30, 2006

(65) Prior Publication Data

US 2007/0098325 A1    May 3, 2007

Related U.S. Application Data

(63) Continuation of application No. 10/657,862, filed on Sep. 9, 2003, now Pat. No. 7,171,067, which is a continuation-in-part of application No. 10/378,411, filed on Mar. 3, 2003, now Pat. No. 6,922,507.

(60) Provisional application No. 60/360,702, filed on Mar. 1, 2002.

(51) Int. Cl.
G02B 6/12    (2006.01)
G02B 6/26    (2006.01)

(52) U.S. Cl. .......................................... 385/15

(58) Field of Classification Search .................... 385/15, 385/14
See application file for complete search history.

(56) References Cited

U.S. PATENT DOCUMENTS

| | | | |
|---|---|---|---|
| 5,987,050 A * | 11/1999 | Doerr et al. ................. | 372/108 |
| 6,049,640 A * | 4/2000 | Doerr ............................ | 385/15 |
| 6,141,467 A * | 10/2000 | Doerr ............................ | 385/24 |
| 6,240,118 B1 * | 5/2001 | Doerr et al. ................... | 372/64 |
| 6,351,581 B1 | 2/2002 | Doerr et al. | |
| 6,501,875 B2 | 12/2002 | Zhao et al. | |
| 6,519,059 B1 | 2/2003 | Doerr et al. | |
| 6,532,090 B1 | 3/2003 | Doerr et al. | |
| 6,556,746 B1 | 4/2003 | Zhao et al. | |
| 6,597,833 B1 | 7/2003 | Pi et al. | |
| 6,606,433 B2 * | 8/2003 | Oguma et al. ................. | 385/37 |
| 6,724,954 B2 * | 4/2004 | Arai et al. ...................... | 385/24 |
| 6,724,957 B2 * | 4/2004 | Saida et al. .................... | 385/27 |
| 7,020,398 B2 * | 3/2006 | Takiguchi et al. ........... | 398/158 |
| 2002/0181857 A1 * | 12/2002 | Komatsu et al. .............. | 385/24 |
| 2003/0031406 A1 * | 2/2003 | Saida et al. .................... | 385/27 |
| 2004/0008944 A1 * | 1/2004 | Johannessen et al. ......... | 385/45 |
| 2004/0081462 A1 * | 4/2004 | Sarah .......................... | 398/42 |
| 2004/0218259 A1 * | 11/2004 | Hui et al. ..................... | 359/344 |

(Continued)

OTHER PUBLICATIONS

K. Jinguji et al., "Mach-Zehnder Interferometer Type Optical Waveguide Coupler With Wavelength-Flattened Coupling Radio," Electronics Letters, Aug. 16, 1990, vol. 26, No. 17, pp. 1326-1327.

(Continued)

Primary Examiner—Kianni C Kaveh

(57) ABSTRACT

A proposed integrateable optical interleaver includes an input Y-branch coupler and at least two multi-section optical couplers. The multi-section optical couplers of the interleaver include at least three substantially similar optical couplers, adjacent ones of the optical couplers interconnected via at least one set of waveguides. The interleaver of the present invention comprises a highly compact and fabrication-robust form that is capable of being integrated onto a single planar lightwave circuit.

10 Claims, 12 Drawing Sheets

U.S. PATENT DOCUMENTS

2005/0053320 A1* 3/2005 Doerr et al. .................. 385/15
2005/0169630 A1* 8/2005 Takiguchi et al. ............. 398/53

OTHER PUBLICATIONS

B. E. Little and T. Murphy, "Design Rules for Maximally Flat Wevelength-Insensitive Optical Power Dividors Using Mach-Zehnder Structures," IEEE Photonics Technology Letters, vol. 9, No. 12, Dec. 1997, pp. 1607-1609.

C.R. Doerr et al., "Cross-Connect-Type Wavelength Add-Drop Node with Integrated Band Muxes, Interleavers, and Monitor," Opt. Fib. Comm. Conf., Mar. 23, 2003.

C.R. Doerr et al., Integrated Band Demultiplexer Using Waveguide Grating Routers, IEEE Photonics Technology Letters, vol. 15, No. 8, Aug. 2003.

Doerr et al., Optical Society of America, Mar. 23-28, 2003, p. PD33-1-3 vol. 3 of 3 vol. (v1+802+138) pp. 6 refs.

* cited by examiner

INTEGRATEABLE OPTICAL INTERLEAVER AND DE-INTERLEAVER

CROSS-REFERENCE TO RELATED APPLICATIONS

This patent application is a continuation of and claims priority to commonly-owned, U.S. patent application Ser. No. 10/657,862 entitled "Integrateable Optical Interleaver and De-Interleaver", filed Sep. 9, 2003, now U.S. Pat. No. 7,171, 067 which application is a continuation-in-part of and claims priority to commonly owned Ser. No. 10/378,411, now U.S. Pat. No. 6,922,507 entitled "Low-Loss Integrated Optical Coupler and Optical Switch", filed Mar. 3, 2003, which patent claims the benefit of U.S. Provisional Application Ser. No. 60/360,702, filed Mar. 1, 2002; each of which is herein incorporated by reference in its entirety. The U.S. patent application Ser. No. 10/657,862 entitled "Integrateable Optical Interleaver and De-Interleaver", of which this patent application is a continuation and to which this patent application claims priority, is related to U.S. Pat. No. 6,532,090 entitled "Wavelength Selective Cross-Connect With Reduced Complexity", issued Mar. 11, 2003, and is also related to U.S. Pat. No. 6,519,059 entitled "Wavelength Division Add/Drop Multiplexer", issued February 11, each of which is herein incorporated by reference in its entirety.

FIELD OF THE INVENTION

This invention relates to the field of optical couplers, switches and power splitters and, more specifically, to low-loss integrated optical couplers, optical switches and optical power splitters.

BACKGROUND OF THE INVENTION

Optical couplers, optical switches, such as 1×2 optical switches, and optical power splitters are needed in many optical applications. For instance, one can combine arrays of 1×2 optical switches to make optical cross-connect switch fabrics. It is especially advantageous if these optical switches are integrated onto the same substrate, saving cost, size, and loss and as such may be embedded in integrated networks of optical interconnections. These optical switches should have low loss and maintain good characteristics in the presence of wavelength, polarization, and fabrication (WPF) changes. Similarly, optical power splitters should also have low loss and maintain good characteristics in the presence of wavelength, polarization, and fabrication (WPF) changes.

There are two main characteristics of 1×2 optical switches that are sensitive to WPF changes. The first characteristic is the switching extinction ratio for both outputs, i.e., when the light is switched to output port 1, how much light leaks into output port 2 and vice versa. The second characteristic is the bias point of the switch, i.e., when no electrical power is applied, how accurately is the switch in one of the switch states.

Typically, in electro-optic and polymer materials, the preferred 1×2 optical switch configuration is usually the "Y" switch configuration. This has an accurate power-off state, but often a poor extinction ratio. "Y" switches consume high electrical power when operated thermo-optically in silica waveguides, and so are limited to only materials like $LiNbO_3$, InP, and polymers.

The other main configuration choice for a 1×2 optical switch is the Mach-Zehnder interferometer (MZI) switch configuration. This configuration consists of two couplers connected by two waveguides, one or both waveguides containing phase shifters. Changing the phase difference between the two waveguide arms by 180 causes the optical switch to alternate from one state to the other. The MZI switch typically has a significantly lower thermo-optic power consumption than the "Y" switch. Conventionally, MZI switches comprise either two multi-mode interference (MMI) couplers or two evanescent couplers. However, MMI couplers have significant loss, resulting in a 1×2 optical switch with typically 1.2 dB loss in silica waveguides. In addition, the power splitting ratio of the evanescent couplers is highly sensitive to WPF changes, and as such the switch extinction ratio for at least one of the ports is highly WPF sensitive.

There are also two main characteristics of optical splitters sensitive to WPF changes. The first is the splitting ratio of the optical splitter. The second is the loss of the optical splitter. Conventional optical splitters may implement evanescent couplers because of the low loss associated with these types of couplers. However the splitting ratio of conventional evanescent couplers is highly sensitive to WPF changes and the ratio cannot be readily electrically adjusted in non-electro-optic materials, such as silica waveguides.

SUMMARY OF THE INVENTION

The present invention advantageously provides a low-loss integrated optical coupler. Alternatively, the optical coupler is implemented in an inventive optical device that functions at least, as an optical switch or an optical splitter.

In one embodiment of the present invention, a multi-section optical coupler includes at least three substantially similar optical couplers, adjacent ones of the optical couplers interconnected via at least one set of waveguides, each of the sets of waveguides comprising a path-length difference between the waveguides therein. The multi-section optical coupler comprises at least two arms and the path-length differences are adjustable such that signals traversing the at least two arms undergo a relative phase shift, such that a desired output power splitting ratio for the multi-section optical coupler is achieved.

In another embodiment of the present invention an optical device includes a Y-branch input coupler comprising at least one input port and at least two branches, a Mach-Zehnder interferometer (MZI) in optical communication with the Y-branch coupler, and an output multi-section optical coupler comprising at least two substantially similar optical couplers, adjacent ones of the optical couplers interconnected via at least one set of waveguides, each of the sets of waveguides comprising a path-length difference between the waveguides therein, wherein the optical device comprises at least two arms, each of the arms comprising at least one output port, and includes means for causing portions of an input signal traversing the at least two arms to undergo a relative phase shift, such that an output signal is split between the output ports of the optical device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention herein are being described with respect to a three-section coupler, a 1×2 optical switch and a 1×2 optical splitter, the concepts of the present invention may be applicable in various other configurations and components, such as optical switches comprising a plurality of combinations of inputs and outputs, optical power splitters comprising a plurality of combinations of inputs and outputs, and optical selectors, to name a few.

Figure 1:
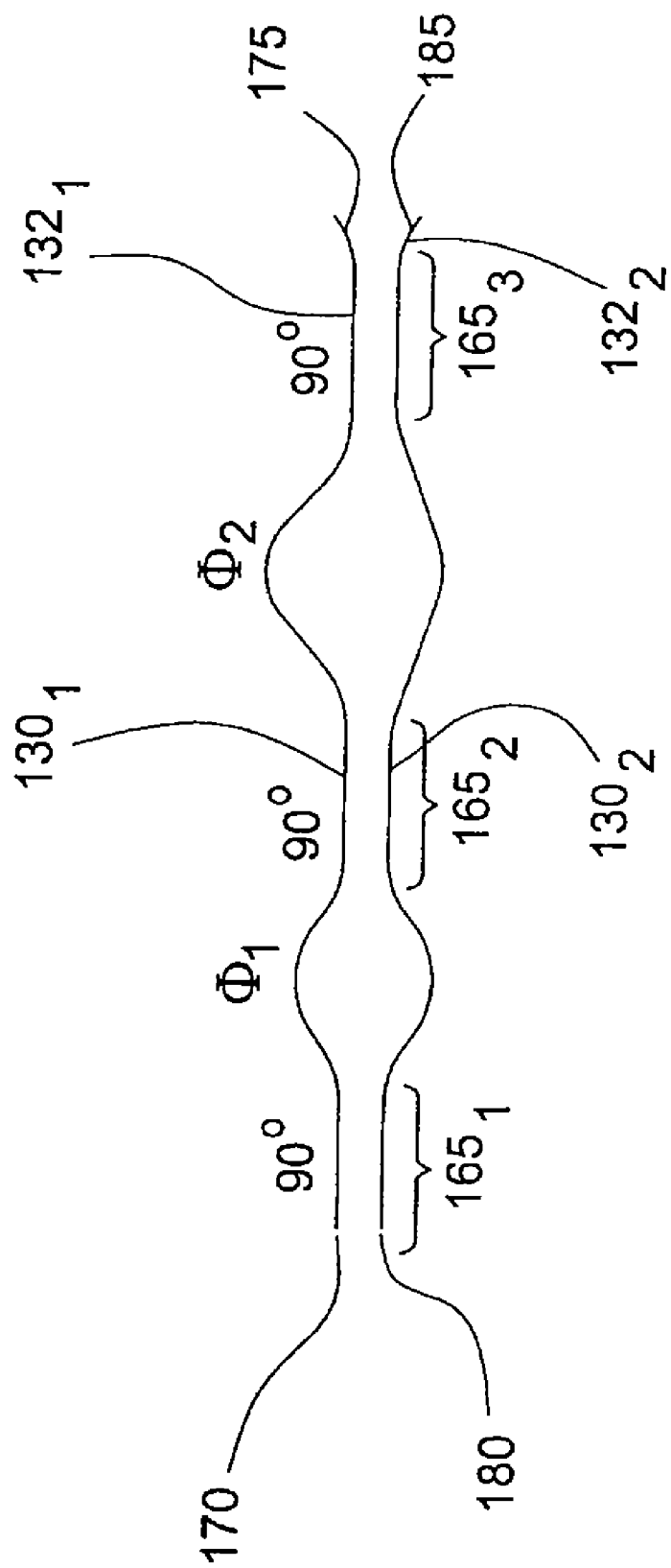
FIG. 1 depicts a high level block diagram of an embodiment of a multi-section optical coupler in accordance with the present invention.

FIG. 1 depicts a high level block diagram of an embodiment of a multi-section optical coupler in accordance with the present invention. The multi-section optical coupler 100 of FIG. 1 illustratively comprises three evanescent couplers $165_1$, $165_2$ and $165_3$ (collectively evanescent couplers 165). The three evanescent couplers 165 are interconnected by two sets of two waveguides $130_1$, $130_2$, and $132_1$, $132_2$ comprising relative path length differences corresponding to phase differences $\phi_1$ and $\phi_2$, respectively, at a center wavelength of interest.

The three evanescent couplers 165 are substantially similar. The evanescent couplers 165 are all substantially equal in length and each comprises a nominal 90° phase shift between their local eigenmodes. The multi-section optical coupler 100 further comprises an upper branch 170 with an output port 175 and a lower branch 180 with an output port 185. Although in FIG. 1, the multi-section optical coupler 100 is depicted as comprising evanescent couplers 165, other couplers having similar properties, such as adiabatic couplers, may be implemented within a multi-section optical coupler in accordance with the present invention. Furthermore, although in FIG. 1 the multi-section optical coupler 100 is depicted as comprising three couplers, other numbers of couplers may be implemented within a multi-section optical coupler in accordance with the present invention.

Because the three evanescent couplers 165 are substantially similar, the couplers 165 change in substantially the same manner in the presence of WPF changes, giving the multi-section optical coupler 100 high WPF tolerance. A desired power splitting ratio for the multi-section optical coupler 100 is obtained by adjusting the relative phases of $\phi_1$ and $\phi_2$. The values of $\phi_1$ and $\phi_2$ are adjusted by varying the relative path lengths between the waveguides of the two sets of two waveguides $130_1$, $130_2$, and $132_1$, $132_2$ interconnecting the three evanescent couplers 165, respectively. That is, by changing the length of waveguide $130_1$ with respect to waveguide $130_2$, the value of $\phi_1$ is altered. Similarly, by changing the length of waveguide $132_1$ with respect to waveguide $132_2$, the value of $\phi_2$ is altered. Alternatively, the power splitting ratio may be tuned by adjusting $\phi_1$ and/or $\phi_2$ with a means for causing a phase shift such as for example, tunable phase shifters, such as thermo-optic phase shifters or filters (not shown), located within at least one of the waveguides of each of the two sets of two waveguides $130_1$, $130_2$, and $132_1$, $132_2$ interconnecting the three evanescent couplers 120. In the present invention, the path lengths between the waveguides of the two sets of two waveguides $130_1$, $130_2$, and $132_1$, $132_2$ may be on the order of an optical wavelength of an optical signal traversing the set of waveguides. Specific values for $\phi_1$ and $\phi_2$ are determined to obtain a desired power splitting.

For example if the inputs to the multi-section coupler 100 are $u_1$ and $u_2$ (the complex amplitudes of the fields of an input signal), then the outputs $v_1$ and $v_2$ are characterized according to equation one (1), which follows:

$$\begin{bmatrix} v_1 \\ v_2 \end{bmatrix} = \frac{1}{2\sqrt{2}} \begin{bmatrix} \cos(\theta/2) & j\sin(\theta/2) \\ j\sin(\theta/2) & \cos(\theta/2) \end{bmatrix} \quad (1)$$

$$\begin{bmatrix} e^{j\phi_2} & 0 \\ 0 & 1 \end{bmatrix} \begin{bmatrix} \cos(\theta/2) & j\sin(\theta/2) \\ j\sin(\theta/2) & \cos(\theta/2) \end{bmatrix} \begin{bmatrix} u_1 \\ u_2 \end{bmatrix}$$

$$\begin{bmatrix} \cos(\theta/2) & j\sin(\theta/2) \\ j\sin(\theta/2) & \cos(\theta/2) \end{bmatrix} \begin{bmatrix} e^{j\phi_1} & 0 \\ 0 & 1 \end{bmatrix}$$

$$\begin{bmatrix} \cos(\theta/2) & j\sin(\theta/2) \\ j\sin(\theta/2) & \cos(\theta/2) \end{bmatrix} \begin{bmatrix} u_1 \\ u_2 \end{bmatrix}$$

where θ is the accumulated phase difference between the eigenmodes in each of the evanescent couplers 165. WPF changes affect the evanescent couplers 165 the most, with almost no effect on $\phi_1$ or $\phi_2$. Thus if $\theta=\pi/2+2\Delta$, where $\Delta\ll1$, (Δ depicting the change in phase in $\phi_1$ and $\phi_2$ due to WPF changes) then equation (1) is rewritten according to equation two (2), which follows:

$$\begin{bmatrix} v_1 \\ v_2 \end{bmatrix} = \frac{1}{2\sqrt{2}} \begin{bmatrix} 1-\Delta & j+j\Delta \\ j+j\Delta & 1-\Delta \end{bmatrix} \begin{bmatrix} e^{j\phi_2} & 0 \\ 0 & 1 \end{bmatrix} \begin{bmatrix} 1-\Delta & j+j\Delta \\ j+j\Delta & 1-\Delta \end{bmatrix} \quad (2)$$

-continued $$\begin{bmatrix} e^{j\phi_1} & 0 \\ 0 & 1 \end{bmatrix} \begin{bmatrix} 1-\Delta & j+j\Delta \\ j+j\Delta & 1-\Delta \end{bmatrix} \begin{bmatrix} u_1 \\ u_2 \end{bmatrix}.$$

The coupling ratio is characterized according to equation three (3), which follows:

$$R = \frac{1}{8} |1 + e^{j\phi_2} - e^{j\phi_1} + e^{j\phi_1 + j\phi_2}|^2. \quad (3)$$

The power-splitting ratio is thus R:(1-R). The WPF sensitivity (sensitivity to $\Delta$) of the coupling ratio, R, is minimized according to equation four (4), which follows:

[1+cos $\phi_2$−cos $\phi_1$+cos($\phi_1$+$\phi_2$)][−1−cos $\phi_2$−3 cos $\phi_1$−cos($\phi_1$+$\phi_2$)]=−[sin $\phi_2$−sin $\phi_1$+sin($\phi_1$+$\phi_2$)][− sin $\phi_2$−3 sin $\phi_1$−sin($\phi_1$+$\phi_2$)]. (4)

There are thus two equations, (3) and (4), for two variables, $\phi_1$ and $\phi_2$. The equations are transcendental and may be solved. Examples of solutions for $\phi_1$ and $\phi_2$ are listed in Table 1, which follows:

TABLE 1

| Coupling ratio | $\phi_1$ | $\phi_2$ |
| --- | --- | --- |
| 50/50 | 0° | 120° |
| 75/25 | 116.9° | 34.2° |
| 90/10 | 110.1° | 58.4° |
| 100/0 | 90° | 90° |

$\phi_1$ and $\phi_2$ can be interchanged and/or both multiplied by a negative one without affecting the coupling ratio (e.g., 117°, 33.7° and −117°, −33.7° and 33.7°, 117°, and −33.7°, −117° all give the same ratio). If one of the values of $\phi_1$ or $\phi_2$ is multiplied by a negative one however, the coupling ratio flips (e.g., 117°, 33.7° gives a 75/25 ratio, whereas 117°, −33.7° gives a 25/75 ratio). Also, the values of $\phi_1$ and $\phi_2$ may be slightly modified depending on whether the change in coupler ratio due to a WPF change, $\Delta$, is desired to be maximally flat or have some ripple.

A multi-section optical coupler in accordance with the present invention is capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosophosilicate glass, lithographically patterning the core layer to define the waveguide configuration, and depositing an upper core layer of phosophosilicate glass. Such a technique is discussed generally in U.S. Pat. No. 4,902,086, issued to C. H. Henry et al. on Feb. 20, 1990, which is herein incorporated by reference in its entirety.

Figure 2:
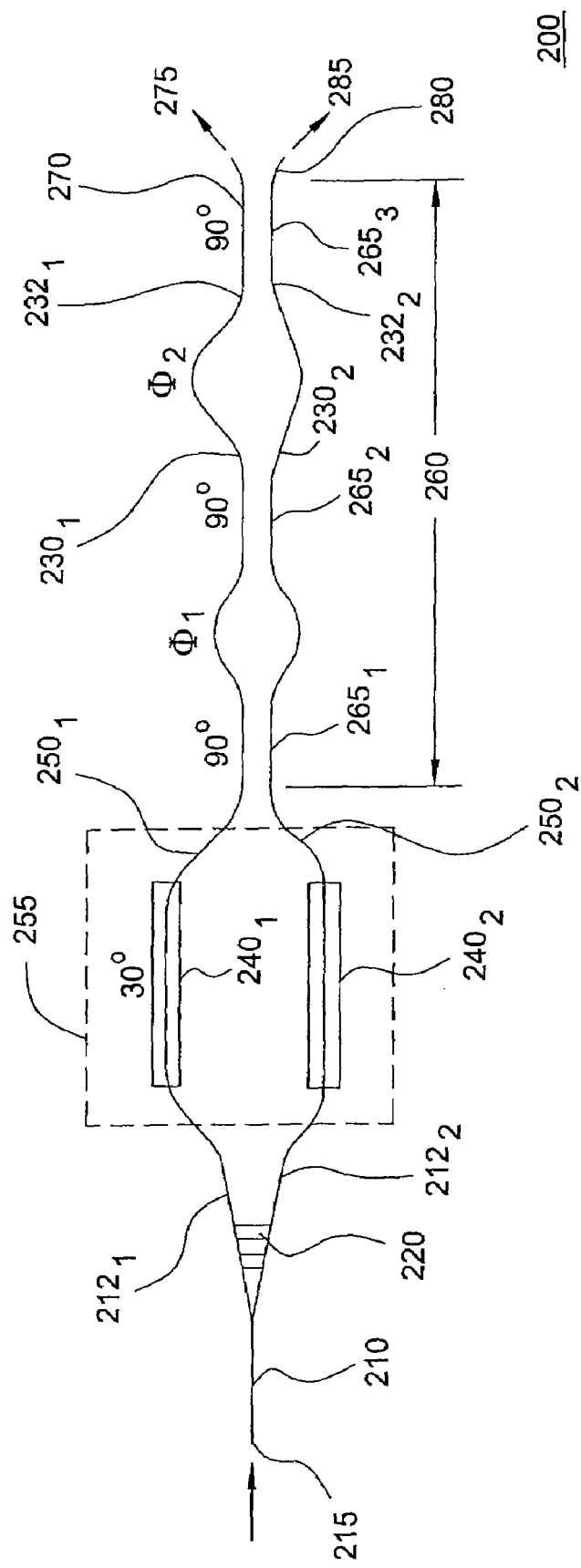
FIG. 2 depicts a high level block diagram of an inventive optical switch including an embodiment of a multi-section optical coupler in accordance with the present invention.

A multi-section optical coupler in accordance with the present invention, such as the multi-section optical coupler 100 of FIG. 1, may be used for comprising an inventive optical switch. For example, FIG. 2 depicts a high level block diagram of an inventive optical switch including an embodiment of a multi-section optical coupler in accordance with the present invention. The optical switch 200 of FIG. 2 comprises a Y-branch coupler 210 comprising an input port 215 and two branches $212_1$ and $212_2$ (collectively branches 212). A plurality of Y-branch segments (collectively Y-branch segments 220) are located substantially vertically between the branches of the Y-branch coupler 210. The Y-branch segments 220 are generally parallel to each other and transversely intersect the two branches 212 of the Y-branch coupler 210 and significantly reduce insertion loss. Such a technique for reducing insertion loss is generally discussed in U.S. Pat. No. 5,745,618, issued to Y. P. Li on Apr. 28, 1998, which is herein incorporated by reference in its entirety.

The optical switch 200 further comprises two waveguide arms one each following a respective branch $212_1$ and $212_2$ of the Y-branch coupler 210, and two phase shifting means, illustratively phase shifters $240_1$ and $240_2$ (collectively phase shifters 240), one each located in a respective one of the waveguide arms. The waveguide arms and the phase shifters 240 form two Mach-Zehnder interferometer (MZI) arms $250_1$ and $250_2$ (collectively Mach-Zehnder interferometer arms 250) of the MZI 255 of the optical switch 200.

As mentioned above, the optical switch 200 comprises a three-section coupler 260 substantially similar to the multi-section coupler 100 of FIG. 1. The three-section coupler comprises, illustratively, three evanescent couplers $265_1$, $265_2$ and $265_3$ (collectively evanescent couplers 265) following the MZI arms 250. The three evanescent couplers 265 are interconnected by two sets of two waveguides $230_1$, $230_2$, and $232_1$, $232_2$ comprising relative path length differences corresponding to phase differences $\phi_1$ and $\phi_2$, respectively, at a center wavelength of interest.

The three evanescent couplers 265 are substantially similar. Each of the evanescent couplers 265 are all substantially equal in length and each comprises a nominal 90° phase shift between their local eigenmodes. The three-section coupler 260 comprises an upper branch 270 with an output port 275, and a lower branch 280 with an output port 285. Although in FIG. 2, the three-section coupler 260 is depicted as comprising evanescent couplers 265, other couplers comprising similar properties, such as adiabatic couplers, may be implemented within the three-section coupler 260 of the present invention. Furthermore, although in FIG. 2 the MZI 255 is depicted as comprising phase shifters 240, various means, such as filters, of providing a phase shift to propagating optical signals are known in the art, and as such, it will be appreciated by those skilled in the art informed by the teachings of the present invention, that such other means may be implemented within the concepts of the present invention in place of the phase shifters illustrated in FIG. 2.

The Y-branch segments 220 of the optical switch 200 are comprised of segments of waveguide oriented substantially perpendicular to the input port 215 and located between the branches 212 of the Y-branch coupler 210. These segments 220 have a constant center-to-center spacing but decrease gradually in width as they approach the MZI arms 250. The Y-branch coupler 210 comprising the Y-branch segments 220 has very low input loss. The three-section coupler 260 comprising the evanescent couplers 265 also has very low loss. As such, the optical switch 200 also maintains a low total loss.

The Y-branch coupler 210, the MZI 255, and the evanescent couplers 265 comprising the optical switch 200 of FIG. 2 are capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosophosilicate glass, lithographically patterning the core layer to define the waveguide configuration, and depositing an upper core layer of phosphosilicate glass. Such a technique is discussed generally in U.S. Pat. No. 4,902,086, issued to C. H. Henry et al. on Feb. 20, 1990, which is herein incorporated by reference in its entirety.

The upper and lower branches of the optical switch 300 both comprise substantially similar means for causing phase shifts, illustratively the phase shifters 240, in order to maintain symmetry. By maintaining the upper and lower branches of the optical switch 200 symmetrical in this regard, it is possible to maintain a relative phase shift between the upper and lower branches of the optical switch that is substantially small when the optical switch is in its power-off (un-powered) state.

For example, in the optical switch 200 of FIG. 2, the phase difference between the two MZI arms $250_1$ and $250_2$ is illustratively 30 degrees (30°). As such, a 30° path-length bias is applied to the upper MZI arm $250_1$. With this configuration, a signal input to the optical switch 200 is directed to the upper MZI arm $250_1$ and subsequently to the upper output port 275 of the optical switch 200 during the power-off state. To switch the signal to the other output, either one or both of the phase shifters 240 is manipulated (driven) such that a first portion of an input signal traversing the upper arm of the optical switch 200 and a second portion of the input signal traversing the lower arm of the optical switch 200 experience a 180° relative phase shift.

In an alternate embodiment of the present invention, a bias of 60° is applied to the lower MZI arm $250_2$ to enable the operation of the optical switch 200 in a push-pull fashion. That is, an input signal is split 50/50 between the two output ports 275, 285 of the optical switch 200 during the power-off state. In such a case one phase shifter of the optical switch 200 is manipulated (driven) to switch an output signal to one of the output ports, and the other phase shifter is manipulated (driven) to switch an output signal to the other of the output ports.

The optical switch 200 is highly tolerant to wavelength, polarization, and fabrication (WPF) changes. The Y-branch coupler 210, itself, maintains a highly accurate power splitting ratio (50/50) and phase difference (zero) between its branches 212 regardless of WPF changes. The three-section coupler 260 also gives a highly accurate power splitting ratio (50/50).

An input optical signal to the optical switch 200 experiences very low loss in the Y-branch coupler 210. The input optical signal is split into two portions in the Y-branch coupler 210. A portion of the input optical signal propagates through the upper arm $250_1$ of the MZI 255 and the upper branch 270 of the three-section coupler 260 and a portion of the input optical signal propagates through the lower arm $250_2$ of the MZI 255 and the lower branch 280 of the three-section coupler 260 wherein the signals undergo relative phase shifts such that only one of the portions of the input optical signal is output through one of the output ports 275, 285 of the optical switch 200. The optical switch 200 of the present invention provides an integrated optical switch that comprises low thermo-optic power consumption, low loss, and high tolerance (i.e., low sensitivity) to wavelength, polarization, and fabrication (WPF) changes.

In an alternate embodiment of the present invention, the optical switch 200 of FIG. 2 is used as a power splitter with high tolerance to WPF changes. That is, a desired power splitting ratio is obtained by adjusting the values of $\phi_1$ and/or $\phi_2$ of the three-section coupler 260. The values of $\phi_1$ and/or $\phi_2$ may be adjusted, as described above with respect to the multi-section coupler 100 of FIG. 1, by varying the relative path lengths between the waveguides of the two sets of two waveguides $230_1$, $230_2$, and $232_1$, $232_2$ interconnecting the three evanescent couplers 265, respectively. Alternatively, the power splitting ratio may be tuned by adjusting $\phi_1$ and/or $\phi_2$ with a means for causing a phase shift such as for example, tunable phase shifters, such as thermo-optic phase shifters or filters (not shown), located within at least one of the waveguides of each of the two sets of two waveguides $230_1$, $230_2$, and $232_1$, $232_2$ interconnecting the three evanescent couplers 265. Values for $\phi_1$ and $\phi_2$ may be determined to obtain a desired power splitting ratio with WPF tolerance as described above with respect to the multi-section coupler 100 FIG. 1.

The optical switch 200 of FIG. 2 is capable of functioning as a 2×1 selector if input signals are input into the output ports 275, 285 (i.e., used in the opposite direction).

Figure 3:
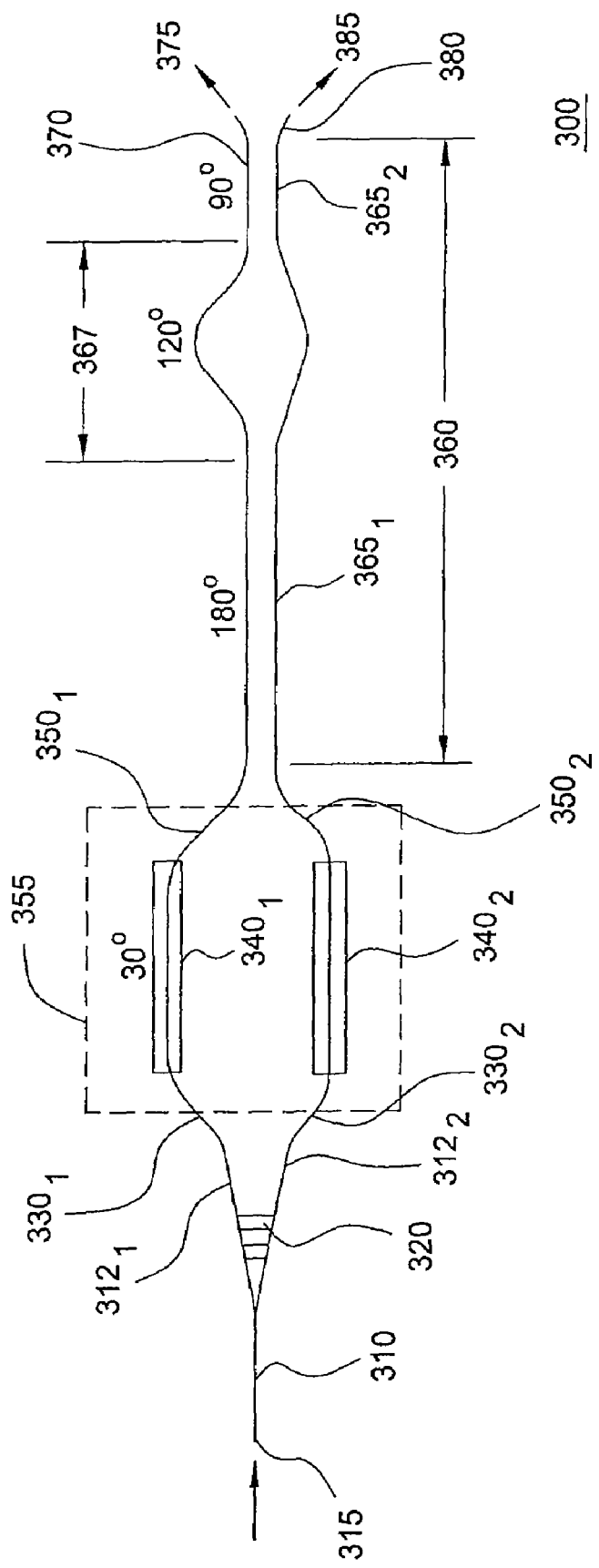
FIG. 3 depicts a high level block diagram of an alternate embodiment of an optical switch in accordance with the present invention.

FIG. 3 depicts a high level block diagram of an alternate embodiment of an inventive optical switch in accordance with the present invention. In the optical switch 300 of FIG. 3, the three-section coupler 260 of FIG. 2 is replaced with a two-section coupler 360. The optical switch 300 of FIG. 3 comprises a Y-branch coupler 310 comprising an input port 315 and two branches $312_1$ and $312_2$ (collectively branches 312). A plurality of Y-branch segments (collectively Y-branch segments 320) are located substantially vertically between the branches 312 of the Y-branch coupler 310. The Y-branch segments 320 are generally parallel to each other and transversely intersect the two branches 312 of the Y-branch coupler 310 and significantly reduce insertion loss.

The optical switch 300 further comprises two waveguide arms $330_1$ and $330_2$ (collectively waveguide arms 330), one each in optical communication with a respective branch $312_1$ and $312_2$ of the Y-branch coupler 310, and two phase shifting means, illustratively phase shifters $340_1$ and $340_2$ (collectively phase shifters 340), one each located in a respective one of the waveguide arms $330_1$ and $330_2$. The waveguide arms 330 and the phase shifters 340 form two Mach-Zehnder interferometer (MZI) arms $350_1$ and $350_2$ (collectively Mach-Zehnder interferometer arms 350) of the MZI 355 of the optical switch 300.

As mentioned above, the optical switch 300 comprises a two-section coupler 360 comprising, illustratively, two evanescent couplers $365_1$ and $365_2$ (collectively evanescent couplers 365) following the Mach-Zehnder interferometer arms 350. The two evanescent couplers 365 are interconnected in the middle at a bend section 367 by a set of two waveguides comprising path length differences. As illustrated in FIG. 3, the two-section coupler 360 comprises an upper branch 370 with an output port 375, and a lower branch 380 with an output port 385. Although in FIG. 3, the two-section coupler 360 is depicted as comprising evanescent couplers 365, other couplers comprising similar properties, such as adiabatic couplers, may be implemented within a two-section coupler 360 of an optical switch in accordance with the present invention. Furthermore, although in FIG. 3 the MZI 355 is depicted as comprising phase shifters 340, various means, such as filters, of providing a phase shift to propagating optical signals are known in the art, and as such, it will be appreciated by those skilled in the art informed by the teachings of the present invention, that such other means may be implemented within the concepts of the present invention in place of the phase shifters illustrated in FIG. 3.

In FIG. 3, the illustrated number of degrees is representative of the relative phase differences between local eigenmodes accumulated in each section. That is, the first evanescent coupler $365_1$ illustratively comprises a phase of 180°, the bend section 367 illustratively comprises a phase of 120°, and the second evanescent coupler $365_2$ illustratively comprises a phase of 90°.

For the optical switch 300 to maintain an optimum tolerance to WPF changes, the first evanescent coupler $365_1$ must be configured such that a phase shift in the first evanescent coupler $265_1$ is equal to twice the phase shift of the second evanescent coupler $265_2$. In the optical switch 300 of FIG. 3, however, this cannot be accomplished by simply making the length of the first evanescent coupler $365_1$ twice that of the second evanescent coupler $365_2$ because both evanescent couplers 265 comprise the same bends at the bend section 367 and, as such, WPF changes will affect each of the evanescent couplers 365 differently. As such, lengths for the evanescent couplers 365 must be determined such that the first evanescent coupler $365_1$ has a length greater than the second evanescent coupler $365_2$ and the phase shift of the first evanescent coupler $365_1$ is equal to twice the phase shift of the second evanescent coupler $365_2$.

The Y-branch segments 320 of the optical switch 300 are also comprised of segments of waveguide oriented perpendicular to the input port 315 and located between the branches 312 of the Y-branch coupler 310. These segments 320 have a constant center-to-center spacing but decrease gradually in width as they approach the MZI arms 350. The Y-branch coupler 310 comprising the Y-branch segments 320 has very low input loss. The two-section coupler 360 comprising the evanescent couplers 365 also has very low loss. As such, the optical switch 300 maintains a low total loss, below 0.5 dB in silica waveguides.

The Y-branch coupler 310, the MZI 355, and the evanescent couplers 365 comprising the optical switch 300 of FIG. 3 are capable of being constructed from planar waveguides according to well-known fabrication techniques as described above with respect to the optical switch 200 of FIG. 2.

The upper and lower branches of the optical switch 300 both comprise substantially similar means for causing phase shifts, the phase shifters 340, in order to maintain symmetry. By maintaining the upper and lower branches symmetrical in this regard, it is possible to maintain a relative phase shift between the upper and lower branches of an optical switch that is substantially small when the optical switch is in its power-off (un-powered) state as described above for the optical switch 200 of FIG. 2.

The optical switch 300 is highly tolerant to wavelength, polarization, and fabrication (WPF) changes. The Y-branch coupler 310, itself, maintains a highly accurate power splitting ratio (50/50) and phase difference (zero) between its branches 312 regardless of WPF changes. The two-section coupler 360 also gives a highly accurate power splitting ratio (50/50) but must be oriented such that the evanescent coupler with the longer path length (illustratively evanescent coupler $365_1$) is closest to the Y-branch coupler 310 to ensure an accurate phase difference between the upper and lower arms of the optical switch 300 and thus achieve an accurate power-off state.

An input optical signal to the optical switch 300 experiences very low loss in the Y-branch coupler 310. The input optical signal is split in the Y-branch coupler 310. A portion of the input optical signal propagates through the upper arm $350_1$ of the MZI 355 and the upper branch 370 of the two-section coupler 360 and a portion of the input optical signal propagates through the lower arm $350_2$ of the MZI 355 and the lower branch 380 of the two-section coupler 360 wherein the signals undergo relative phase shifts such that only one of the portions of the input optical signal is output through one of the output ports 375, 385 of the optical switch 300. The optical switch 200 of the present invention provides an integrated optical switch that comprises low thermo-optic power consumption, low loss, and high tolerance (i.e., low sensitivity) to wavelength, polarization, and fabrication (WPF) changes.

Figure 4:
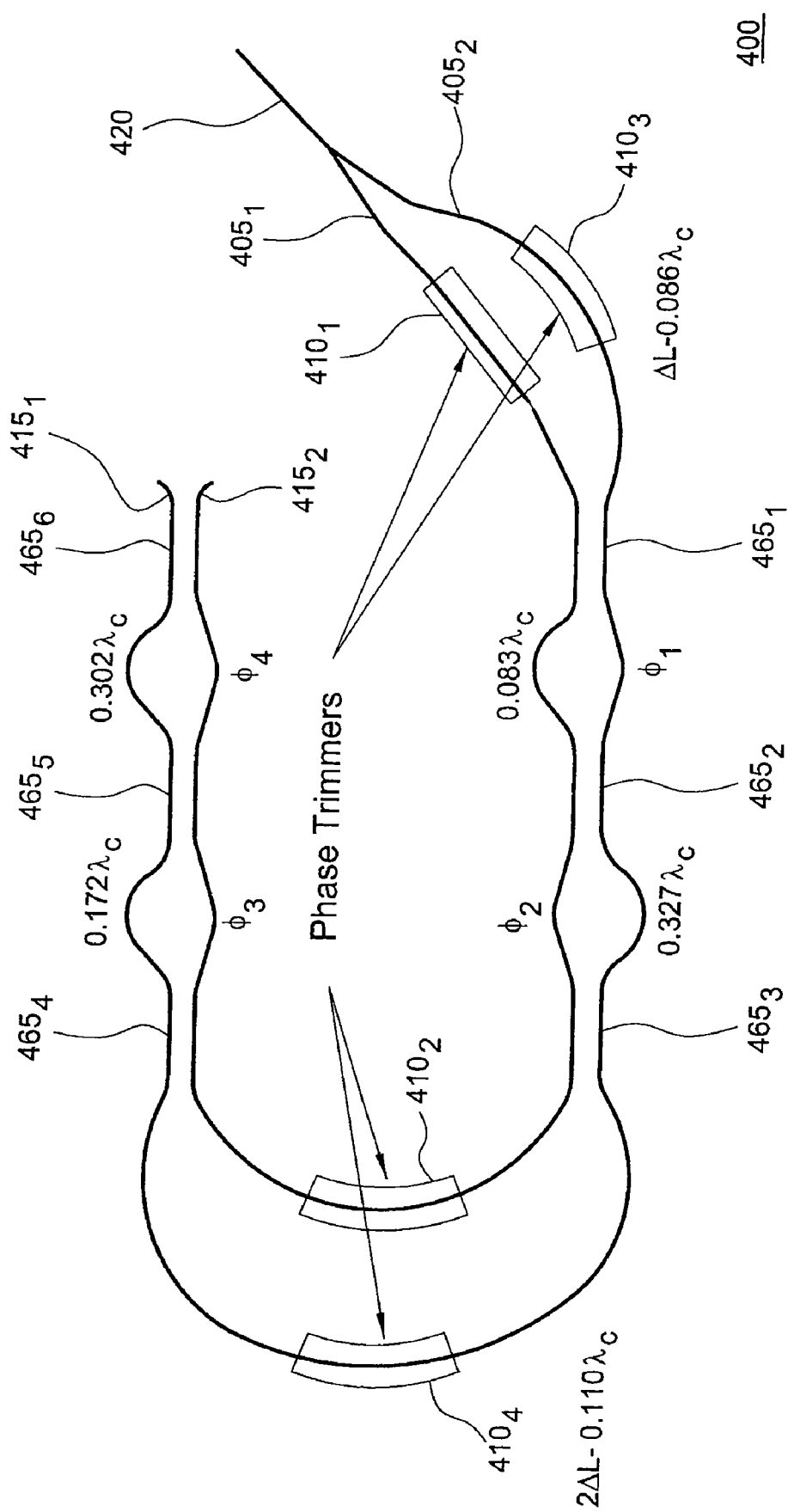
FIG. 4 depicts a high level block diagram of one embodiment of an interleaver/de-interleaver in accordance with the present invention

FIG. 4 depicts a high level block diagram of one embodiment of an interleaver/de-interleaver in accordance with the present invention. Because the function of a de-interleaver and an interleaver are substantially similar, the interleaver 400 of FIG. 4 is meant to be a representative embodiment of both a de-interleaver and an interleaver in accordance with the present invention. The interleaver 400 of FIG. 4 is illustratively a Fourier-filter type interleaver. That is, the interleaver 400 comprises a two-stage Mach-Zehnder interferometer (MZI) comprising two arms $405_1$ and $405_2$. The interleaver 400 further comprises means for causing a phase shift (illustratively, two thermooptic trimmers on each arm) $410_1$, $410_2$, $410_3$ and $410_4$ on the MZI arms $405_1$, $405_2$ to adjust the phases in the arms $405_1$, $405_2$. Each of the MZI arms $405_1$, $405_2$ further comprises a respective output port $415_1$ and $415_2$. In order to configure the integrated interleavers with a high yield yet a compact form factor, a y-branch coupler 420 is implemented as a first coupler for the interleaver 400, while novel multi-section optical couplers are implemented for the following two couplers of the interleaver 400.

The multi-section optical couplers of FIG. 4 each illustratively comprise three evanescent couplers $465_1$, $465_2$, $465_3$, $465_4$, $465_5$ and $465_6$ (collectively, evanescent couplers 465). The two sets of three evanescent couplers 465 each comprise relative path length differences between respective waveguides interconnecting the three evanescent couplers 465. The relative path length differences correspond to respective phase differences $\phi_1$, $\phi_2$, and $\phi_3$, $\phi_4$ at a center wavelength of interest. Illustratively, in FIG. 4, $\lambda_c$ depicts a central wavelength of interest and the numbers indicate the local path-length differences. Such multi-section optical couplers are described herein.

The respective three evanescent couplers 465 of the two multi-section optical couplers are substantially similar. The evanescent couplers 465 are all substantially equal in length and each comprises a nominal 90° phase shift between their local eigenmodes. Although in FIG. 4 the multi-section optical couplers are depicted as comprising evanescent couplers 465, other couplers having similar properties, such as adiabatic couplers, may be implemented within a multi-section optical coupler in accordance with the present invention. Furthermore, although in FIG. 4 the multi-section optical couplers are depicted as comprising three couplers, other numbers of couplers may be implemented within a multi-section optical coupler in accordance with the present invention.

Because in each of the multi-section optical couplers of FIG. 4 the three evanescent couplers 465 are substantially similar, the couplers 465 change in substantially the same manner in the presence of wavelength, polarization and fabrication (WPF) changes, thus providing the multi-section optical couplers with a high WPF tolerance. More specifically, the multi-section optical couplers of the present invention have coupling ratios that are less sensitive to WPF variations.

A desired power splitting ratio for the multi-section optical couplers of FIG. 1 is obtained by adjusting the respective, relative phases of $\phi_1$, $\phi_2$, and $\phi_3$, $\phi_4$ with, for example, the thermo-optic phase shifters $410_1$, $410_2$, $410_3$ and $410_4$ located within the MZI arms $405_1$, $405_2$. Specific respective, values for $\phi_1$, $\phi_2$, and $\phi_3$, $\phi_4$ are determined to obtain a desired power splitting ratio. For example, if the inputs to a multi-section coupler are $u_1$ and $u_2$ (the complex amplitudes of the fields of an input signal), then the outputs $v_1$ and $v_2$ are characterized according to equation one (1), as described hereinabove. As further described hereinabove, if $\theta=\pi/2+2\Delta$, where $\Delta<<1$, then equation (1) is rewritten according to equation two (2), which is also described hereinabove.

The nominal coupling ratio is then characterized according to equation three (3), which is also described hereinabove. The power-splitting ratio is thus R:(1-R). The WPF sensitivity (sensitivity to $\Delta$) of the coupling ratio, R, is minimized according to equation four (4), which is described hereinabove. There are thus two equations, (3) and (4), for two variables, for example, $\phi_1$ and $\phi_2$. The equations are transcendental and may be solved. Examples of solutions for $\phi_1$ and $\phi_2$ are listed in Table 1, which is also depicted and described hereinabove. Substantially the same procedures and calculations described above with respect to the determination of $\phi_1$ and $\phi_2$ may be followed with respect to determining values for $\phi_3$ and $\phi_4$.

An interleaver or de-interleaver in accordance with the present invention is capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosophosilicate glass, lithographically patterning the core layer to define the waveguide configuration, and depositing an upper core layer of phosophosilicate glass. Such a technique is discussed generally in U.S. Pat. No. 4,902,086, issued to C. H. Henry et al. on Feb. 20, 1990, which is herein incorporated by reference in its entirety. Thus, an interleaver or de-interleaver in accordance with the present invention is capable of being integrated onto a planar lightwave circuit (PLC).

Figure 5:
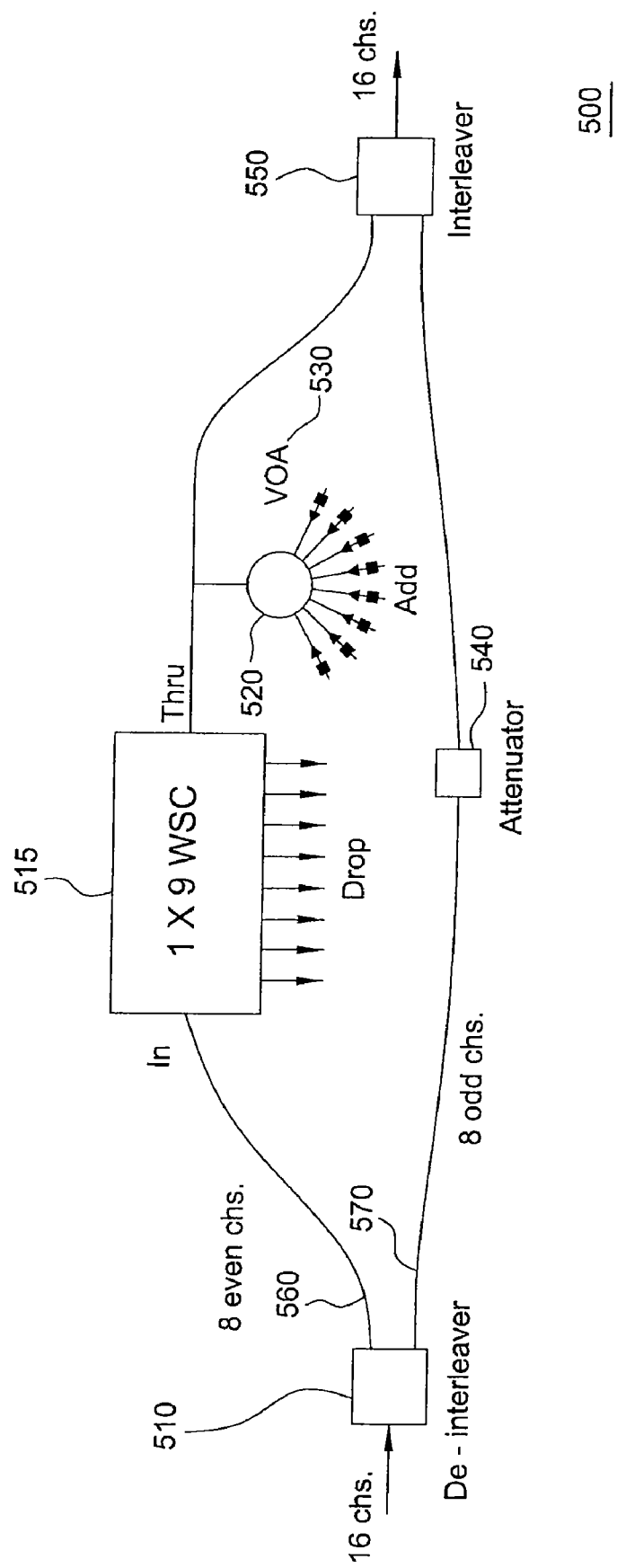
FIG. 5 depicts a high level block diagram of one embodiment of an optical add/drop multiplexer (OADM) start-up node in accordance with the present invention.

An interleaver/de-interleaver in accordance with the present invention, such as the interleaver 400 of FIG. 4, may be used in an inventive optical add/drop multiplexer (OADM) start-up node. For example, FIG. 5 depicts a high level block diagram of one embodiment of an optical add/drop multiplexer (OADM) start-up node in accordance with the present invention. The OADM start-up node 500 of FIG. 5 is illustratively designed to accommodate a 16 channel, 100 GHz spacing WDM system. The OADM start-up node 500 of FIG. 5 comprises a de-interleaver 510, such as the de-interleaver 400 of FIG. 4, a wavelength selective cross-connect (WSC) 515, a coupler (illustratively, a star coupler) 520 having a plurality of variable optical attenuators (VOAs) 530, an attenuator 540, and an interleaver 550, such as the interleaver 400 of FIG. 4.

The OADM start-up node 500 of FIG. 5 further comprises, illustratively, two optical paths 560 and 570. Although in the OADM start-up node 500 of FIG. 5 various components are depicted as specific devices, other devices performing substantially similar functions may replace the depicted devices in accordance with the present invention. For example, the coupler 520 of FIG. 5 may comprise a multimode interference coupler, an evanescent coupler and the like, and the VOAs 530 may comprise micro-electromechanical system (MEMS) optical shutters. Furthermore, the attenuator 540 may also comprise an optical shutter.

In the OADM start-up node 500 of FIG. 5, a 16 channel optical signal is optically communicated to the de-interleaver 510. The de-interleaver separates the 16 channel input optical signal into two, 8-channel 200 GHz spaced signals. In the OADM start-up node 500 of FIG. 5, the de-interleaver 510 illustratively separates the 16 channel input optical signal into a first 8-channel optical signal comprising 8 even-numbered optical channels and 8 odd-numbered optical channels.

Although in FIG. 5 the 16 input optical channels are separated by the de-interleaver 510 into 8 even-numbered optical channels and 8 odd-numbered optical channels, a de-interleaver in accordance with the present invention may be configured to separate input optical channels into other combinations of optical channels, such as the first eight optical channels and the last eight optical channels.

In FIG. 5, the 8 even-numbered optical channels illustratively propagate through the first optical path 560 and the 8 odd-numbered optical channels illustratively propagate through the second optical path 570. In the first optical path 560 the 8 even-numbered optical channels are optically communicated to the WSC 515. In the OADM start-up node 500 of FIG. 5, the dropping of even channels is performed by the WSC 515. The WSC 515 is illustratively a 1×9 WSC and is capable of allowing each dropped channel to appear at any of its output ports. Such a WSC is described in U.S. Pat. No. 6,532,090 entitled "Wavelength Selective Cross-Connect With Reduced Complexity", issued Mar. 11, 2003 to Christopher Doerr, which is herein incorporated by reference in its entirety. The optical channels not dropped by the WSC 515 propagate through the WSC 515 in the first optical path 560.

In the first optical path 560, optical channels are added by the coupler 520 to the optical signal passed through by the WSC 515. The coupler 520 is illustratively a 1×8 star coupler and is capable of allowing each added channel to be of any wavelength, assuming tunable transmitters. Such a coupler is described in U.S. Pat. No. 6,519,059 entitled "Wavelength division add/drop multiplexer", issued Feb. 11, 2003 to Christopher Doerr, which is herein incorporated by reference in its entirety.

The optical signals in the second optical path 570, illustratively the 8 odd-numbered optical channels, are optically communicated to the attenuator 540. When open, the attenuator 540 permits any optical signal communicated from the de-interleaver 510 to pass through to the interleaver 550. When closed, the attenuator 540 absorbs or reflects, desirably with high efficiency, an incident optical channel or channels preventing the channel(s) from reaching the interleaver 550. An attenuator in accordance with the present invention may be configured to absorb or reflect one or more of the optical channels in the path wherein it resides.

The optical signals in the first optical path 560 and the second optical path 570 are then communicated to the interleaver 550 wherein the optical signals are combined, for example, to resemble the input optical signal (e.g., a 16 channel optical signal with 100 GHz channel spacing). In alternate embodiments of the present invention, to increase the add/drop capacity of the OADM start-up node 500 of FIG. 5, the attenuator 540 in the second optical path 570 may be replaced with a second WSC and a second coupler. As evident from FIG. 5, the OADM start-up node 500 is expandable without the disruption of the 8 even-numbered channels in the first optical path 560.

Figure 6:
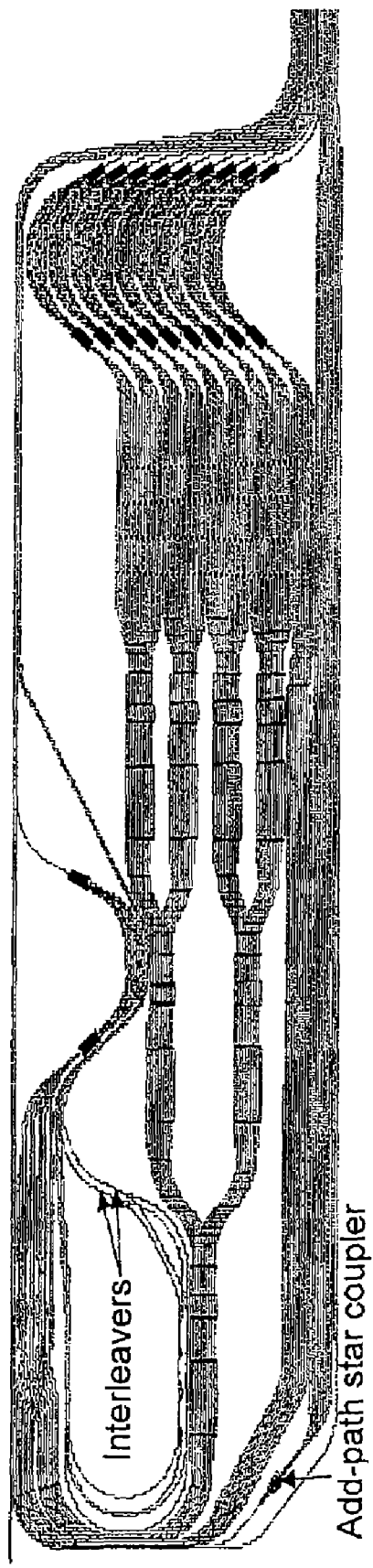
FIG. 6 depicts a more detailed diagram of the OADM start-up node of FIG. 4 in PLC technology.

In alternate embodiments of the present invention, to make the OADM start-up node 500 low cost, the inventors integrated the de-interleaver 510, the WSC 515, the coupler 520 having the VOAs 530 and the interleaver 550 onto one silica waveguide planar lightwave circuit (PLC). FIG. 6 depicts a more detailed diagram of the OADM start-up node 500 of FIG. 5 as a PLC. The inventive PLC OADM start-up node 500 proposed by the inventors comprises a small form factor such that at least three PLC OADMs are capable of being constructed out of a 5 inch silica wafer.

In addition, the interleavers of the present invention are configured to cancel non-zero chromatic dispersion by cascading two stages of the inventive OADM start-up node in accordance with the present invention. For example, in one embodiment of the present invention, the MZI arm lengths of one of the interleavers (e.g., the de-interleaver 510 of FIG. 5 or the interleaver 550 of FIG. 5) is adjusted to shift the wavelength response by substantially half of the interleaver free-spectral range. As such, the net chromatic dispersion in an OADM start-up node in accordance with the present invention for the channels that are not dropped by the WSC is substantially zero.

In an experiment, the inventors constructed a PLC of an embodiment of an inventive OADM start-up node in accordance with the present invention using 0.80% index-step silica waveguides on a silicon substrate. The PLC was fully packaged with its own drivers on a circuit board. One phase shifter on one MZI arm of each of the stages of each interleaver were accessed via probe needles connected to voltage sources. These two voltages were adjusted so as to wavelength-align the interleaver to the WSC passbands and to optimize the crosstalk. For approximately 5 seconds, each voltage was increased to an extremely high value and then decreased, so as to trim via hyperheating. This process was repeated until both applied voltages became zero, leaving the interleaver permanently adjusted and passive.

Figure 7:
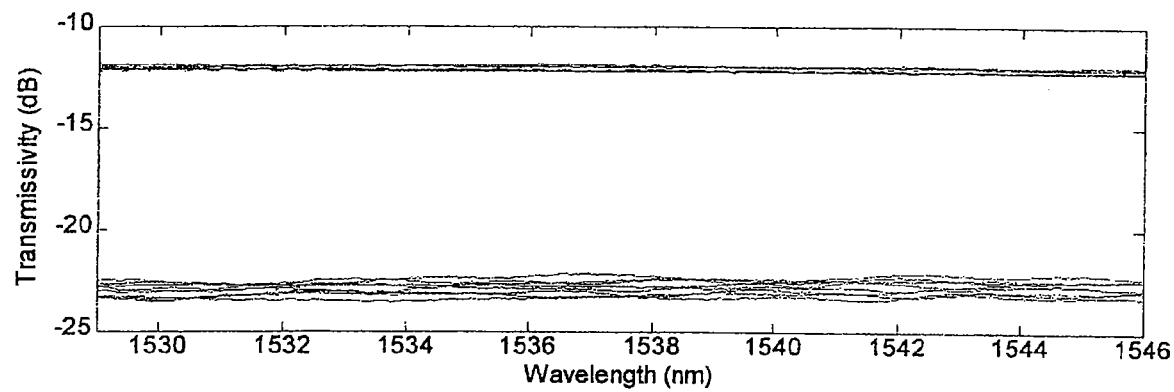
FIG. 7 graphically depicts the measured spectra of eight add paths for eight inputs to an embodiment of a OADM start-up node in accordance with the present invention with variable optical attenuators of an add-star coupler of the OADM start-up node set at 0-dB and 10-dB attenuation.

The add-star coupler path transmissivities for 8 inputs to the OADM start-up node (i.e., 8 even-numbered channels of 16 input channels to the OADM start-up node) are depicted in FIG. 7 with the VOAs set at 0-dB and 10-dB attenuation. FIG. 7 graphically depicts the measured spectra of the eight add paths for the 8 inputs to the OADM start-up node with the VOAs of the add-star coupler of the OADM start-up node set at 0-dB and 10-dB attenuation. In FIG. 7, the transmissivity of the eight add-star coupler paths is plotted against the wavelength range of the input channels. As evident from FIG. 7, the add-star coupler achieves a uniform and relatively low-loss performance across the wavelength range of the input channels.

The VOAs are operated in a push-pull fashion and the polarization-dependent loss (PDL) of the entire add path over the 10-dB range is <1.0 dB. To achieve such uniform, relatively low-loss performance, a symmetric star coupler was used (except for a port shift) with strong mutual coupling and focusing on the phase centers in the arrays, along with segmentation and parallel inlet horn walls. The technique of achieving low insertion loss using parallel inlet horn walls is generally discussed in C. R. Doerr, R. Pafchek, and L. W. Stulz, "16-band integrated dynamic gain equalization filter with less than 2.8-db insertion loss," IEEE Photon. Technol. Lett., vol. 14, pp. 334-336, 2002, which is herein incorporated by reference in its entirety.

Figure 8:
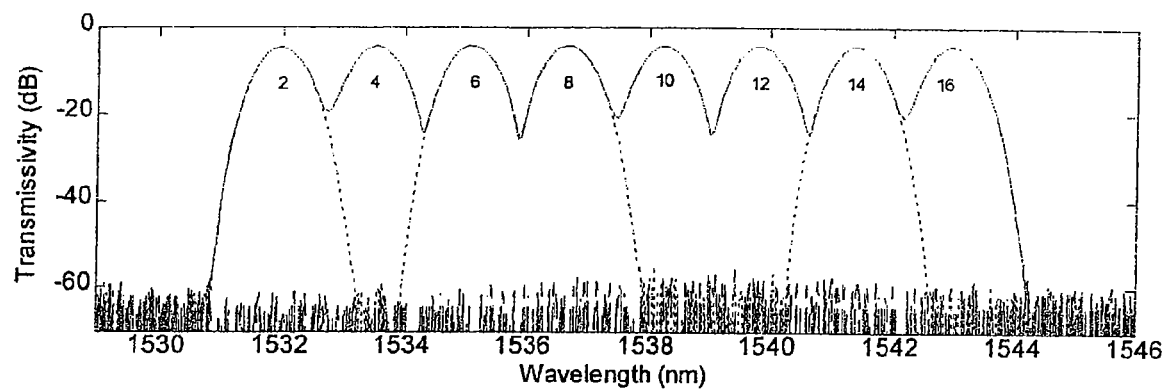
FIG. 8 graphically depicts the measured in-to-thru spectra of a wavelength selective cross-connect of the OADM start-up node of FIG. 7 for three different combinations of eight input channels.

The in-to-thru spectra of the WSC of the OADM start-up node are depicted in FIG. 8 for three different combinations of the 8 input channels described above. FIG. 8 graphically depicts the measured in-to-thru spectra of the WSC for three cases, overlaid: 1) no channels dropped, 2) all channels dropped and, 3) only channels 4, 10 and 12 dropped. In FIG. 8, transmissivity of the WSC is plotted against the wavelength range of the input channels. As evident in FIG. 8, the worst-case loss is less than 4.75 dB and the worst-case extinction ratio is greater than 55 dB. Thru shutters in the WSC also act as VOAs, and the in-to-thru worst-case PDL at 0-dB and 12-dB attenuation are 0.1 and 0.6 dB, respectively.

Figure 9:
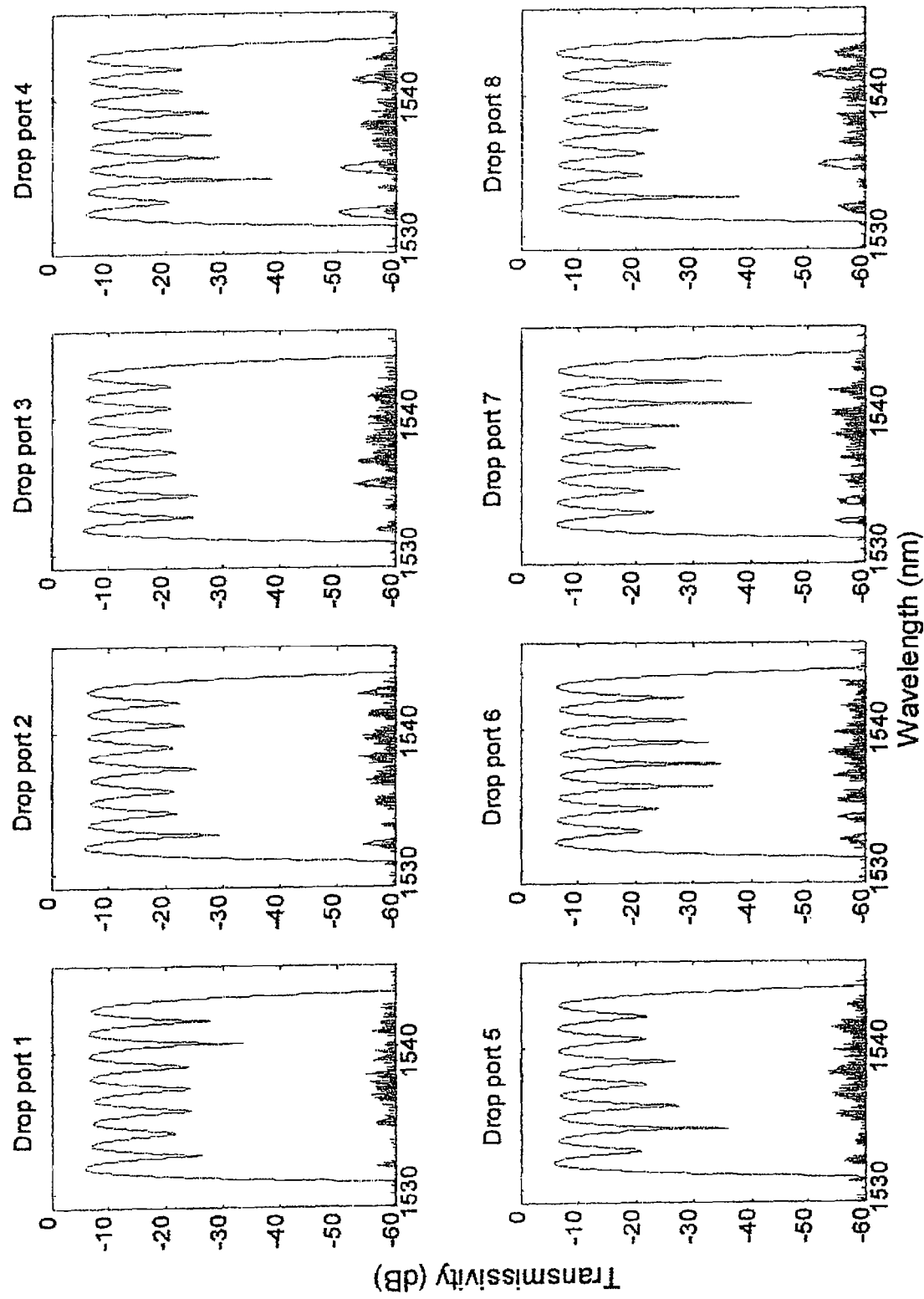
FIG. 9 graphically depicts the measured in-to-drop spectra of the WSC of the OADM start-up node of FIG. 4 for sending all of the eight input channels to each of the eight drop ports of the WSC.

The in-to-drop spectra of the WSC for sending all 8 input channels to each of the 8 drop ports in succession are depicted in FIG. 9. FIG. 9 graphically depicts the measured in-to-drop spectra of the WSC for sending all of the 8 input channels to each of the 8 drop ports of the WSC. In FIG. 9, transmissivity of the drop ports of the WSC is plotted against the wavelength range of the input channels for each plot. As evident in FIG. 9, the worst-case loss is less than 7.5 dB, and the worst-case extinction ratio is greater than 43 dB. To ensure that the extinction ratio is adequate for all 98 possible states of the WSC without measuring them all, each of the switches/shutters was toggled individually, with and without its neighbors activated (to account for thermal crosstalk) and the worst-case extinction ratio of each switch/shutter was measured over all polarizations. The worst-case extinction ratios for all 72 shutters were determined to be between 22.6 and 39.2 dB and for all 64 1×2 switches, for both up and down states, were determined to be between 20.0 and 36.6 dB. Thus the worst possible crosstalk is approximately 42.6 dB.

Figure 10A:
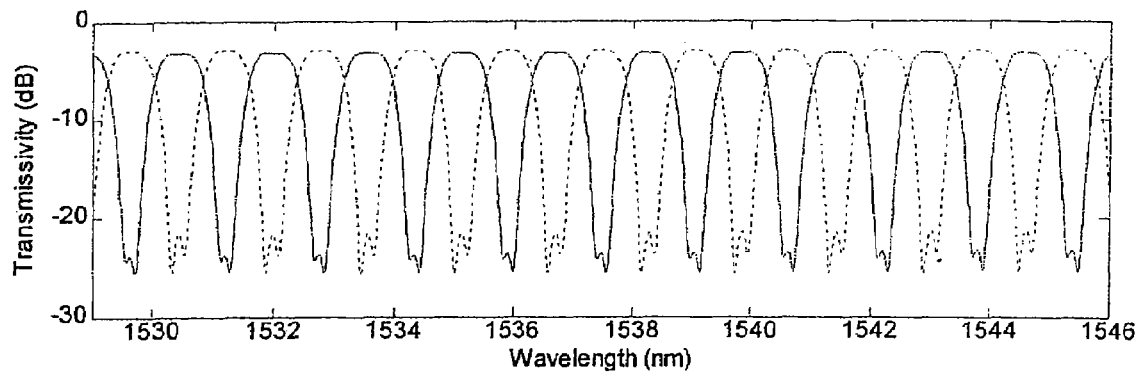
FIGS. 10A and 10B graphically depict the measured spectra of the interleavers of the OADM start-up node of FIG. 7.
Figure 10B:
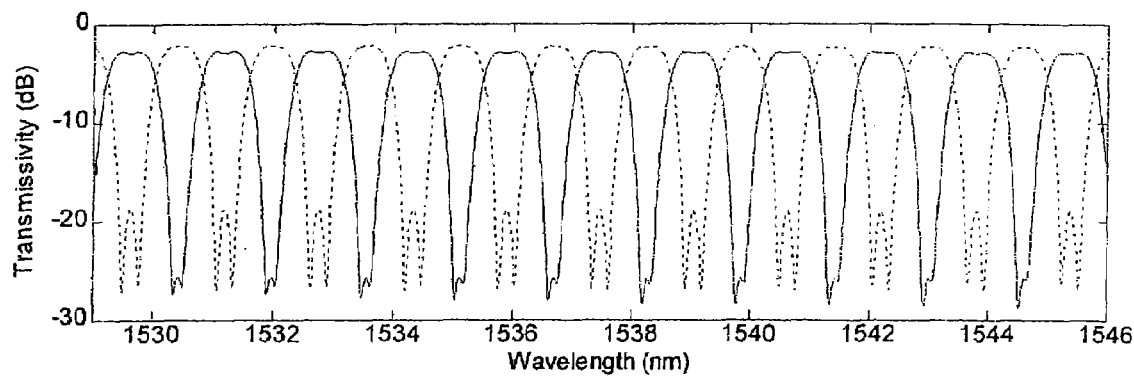

FIGS. 10A and 10B graphically depict the measured spectra of the interleavers of the OADM start-up node. In FIGS. 10A and 10B, transmissivity of an outer interleaver and an inner interleaver, respectively, are plotted against the wavelength range of the input channels for each plot. As evident from FIGS. 10A and 10B, the loss of the interleavers ranges from 2.25 dB to 3.25 dB. The PDL is in the range of 0.1 dB.

Figure 11:
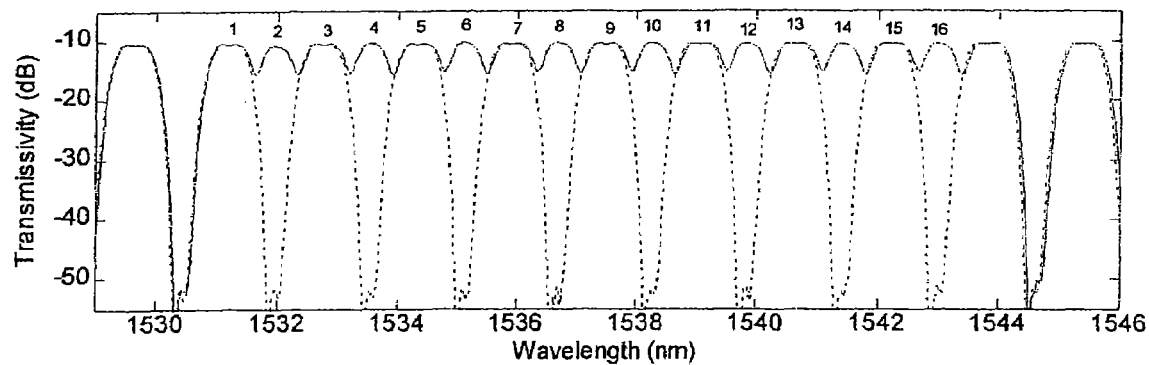
FIG. 11 graphically depicts the through-path spectra of the OADM start-up node of FIG. 7 for the cases of no channels dropped and all input channels dropped.

FIG. 11 graphically depicts the through-path spectra of the OADM start-up node for the cases of no channels dropped and all input channels dropped. In FIG. 11, the measured spectra of the OADM start-up node is measured at the output of the interleaver of the OADM start-up node and overlaid for the cases of no channels dropped and all of the 8 even-numbered input channels dropped. In FIG. 11, the transmissivity of the OADM start-up node is plotted against the wavelength range of the input channels. As evident from FIG. 11, the worst-case through loss is less than 14 dB.

Figure 12:
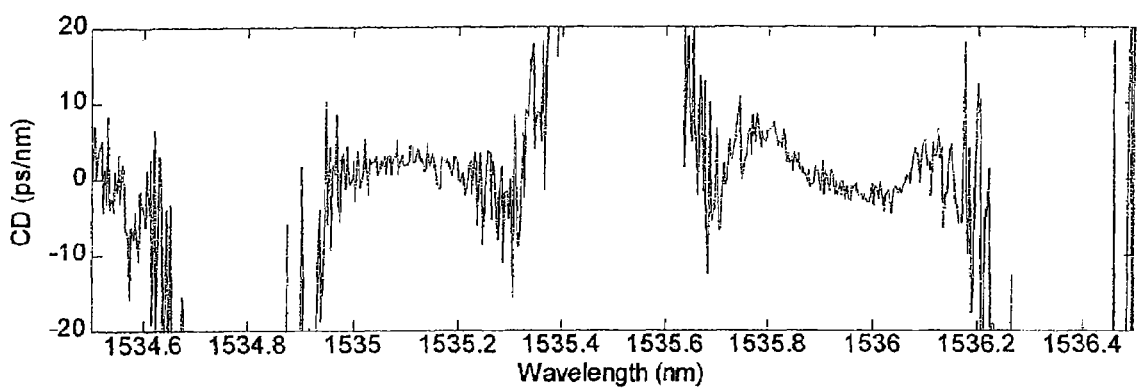
FIG. 12 graphically depicts the measured chromatic dispersion for the through-path of the OADM start-up node of FIG. 7.

FIG. 12 graphically depicts the measured chromatic dispersion for the through path of the OADM start-up node. In FIG. 12, the chromatic dispersion of the OADM start-up node is plotted against the wavelength range of the input channels. As evident from FIG. 12, the magnitude of the chromatic dispersion of this embodiment of a OADM start-up node of the present invention is less than 8 ps/nm over the entire passband.

Figure 13:
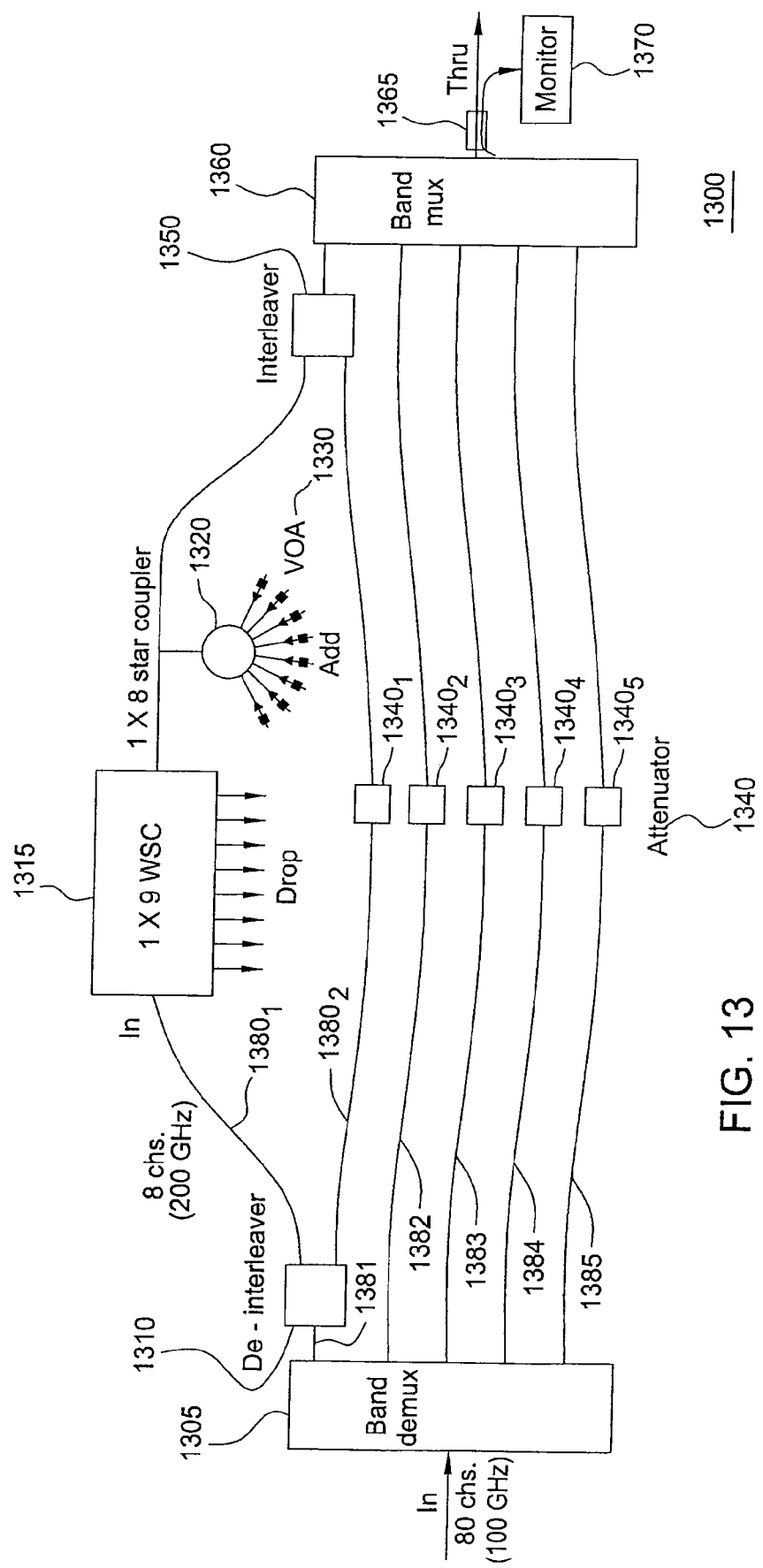
FIG. 13 depicts a high level block diagram of an alternate embodiment of an OADM start-up node in accordance with the present invention.

FIG. 13 depicts a high level block diagram of an alternate embodiment of an OADM start-up node in accordance with the present invention. The OADM start-up node 1300 of FIG. 13 is illustratively designed to accommodate an 80 channel, 100 GHz spacing WDM system. The OADM start-up node 1300 of FIG. 13 comprises substantially similar components as the OADM start-up node 400 of FIG. 4 with the addition of two band filters, an optional output coupler and an optional optical monitor. More specifically, the OADM start-up node 1300 of FIG. 13 comprises an input band filter (illustratively, a band demultiplexer) 1305, a de-interleaver 1310, a wavelength selective cross-connect (WSC) 1315, a coupler (illustratively, a star coupler) 1320 having a plurality of variable optical attenuators (VOAs) 1330, a plurality of attenuators (illustratively, five attenuators) $1340_1$-$1340_5$ (collectively, attenuators 1340), an interleaver 1350, an output band filter (illustratively, a band multiplexer) 1360, an output coupler 1365, and a monitor 1370. The OADM start-up node 1300 of FIG. 13 further comprises a plurality of optical paths (illustratively, five optical paths) 1381, 1382, 1383, 1384 and 1385 (collectively, optical paths 1380). In addition, the first optical path 1381 is further divided into two separate optical paths $1381_1$, and $1381_2$.

Although in the OADM start-up node 1300 of FIG. 13 various components are depicted as specific devices, other devices performing substantially similar functions may replace the depicted devices in accordance with the present invention. For example, the coupler 1320 of FIG. 13 may comprise a multimode interference coupler, an evanescent coupler and the like, the monitor 1370 may comprise a photodetector, and the VOAs 1330 may comprise micro-electromechanical system (MEMS) optical shutters. Furthermore, the attenuators 1340 may also comprise optical shutters.

In the OADM start-up node 1300 of FIG. 13, an 80 channel optical signal is optically coupled to the band demultiplexer 1305. The band demultiplexer 1305 separates the incoming optical spectrum into bands. In the OADM start-up node 1300 of FIG. 13, the band demultiplexer 1305 illustratively separates the 80 channel input optical signal into ten, 8-channel 200 GHz spaced optical bands. Two distinct bands of the ten, 8-channel 200 GHz spaced optical bands propagate through each of the five optical channels 1380 in the OADM start-up node 1300 of FIG. 13. As depicted in FIG. 13, the two optical bands received by the first optical path 1381 are optically coupled to the de-interleaver 1310.

In the OADM start-up node 1300 of FIG. 13, the de-interleaver 1310 illustratively separates the received two, 8-channel 200 GHz spaced optical bands and directs each of the bands into a separate path. Illustratively, a first band of the 8-channel 200 GHz spaced optical bands is directed through the first separated optical path $1381_1$ of the first optical path 1381 and a second of the 8-channel 200 GHz spaced optical bands is directed through the second separated optical path $1381_2$. Although in FIG. 13 the two, 8-channel 200 GHz spaced optical bands are separated by the de-interleaver 1310 and directed into separate optical paths by band, a de-interleaver in accordance with the present invention may be configured to separate input optical channels into other combinations of optical channels, such as the first eight optical channels and the last eight optical channels or the optical channels may be separated into even-numbered optical channels and odd-numbered optical channels.

In the first separated optical path $1381_1$, the first 8-channel 200 GHz spaced optical band propagates to the WSC 1315. In the OADM start-up node 1300 of FIG. 13, the dropping of the channels is performed by the WSC 1315. The WSC 1315 is illustratively a 1×9 WSC and is capable of allowing each dropped channel to appear at any of its output ports. As described above for the OADM start-up node 400 of FIG. 4, such a WSC is described in U.S. Pat. No. 6,532,090 entitled "Wavelength Selective Cross-Connect With Reduced Complexity", issued Mar. 11, 2003 to Christopher Doerr, which is herein incorporated by reference in its entirety. The optical channels not dropped by the WSC 1315 pass through the WSC 1315 in the first separated optical path $1381_1$.

In the first separated optical path $1381_1$, optical channels are added by the coupler 1320 to the optical signal passed through by the WSC 1315. The coupler 1320 is illustratively a 1×8 star coupler and is capable of allowing each added channel to be of any wavelength, assuming tunable transmitters. As described above for the OADM start-up node 400 of FIG. 4, such a coupler is described in U.S. Pat. No. 6,519,059 entitled "Wavelength Division Add/Drop Multiplexer", issued Feb. 11, 2003 to Christopher Doerr, which is herein incorporated by reference in its entirety.

In the second separated optical path $1381_2$, the second 8-channel 200 GHz spaced optical band propagates to attenuator $1340_1$. When open, the attenuator $1340_1$ permits any optical signal communicated from the de-interleaver 1310 to pass through to the interleaver 1350. When closed, the attenuator $1340_1$ absorbs or reflects, desirably with high efficiency, an incident optical channel or channels preventing the channel(s) from reaching the interleaver 1350. An attenuator in accordance with the present invention may be configured to absorb or reflect one or more of the optical channels in the path wherein it resides.

The optical signals in the first separated optical path $1380_1$ and the second separated optical path $1380_2$ then propagate to the interleaver 1350 wherein the optical signals are combined, for example, to resemble the input optical signal (e.g., two, 8-channel 200 GHz spaced optical bands).

The optical signals from the interleaver 1350 then propagate to the band multiplexer 1360 wherein the two, 8-channel 200 GHz spaced optical bands are recombined. A portion of the recombined signal exiting from the band multiplexer 1360 (typically approximately 5%) is tapped by the output coupler 1365 and coupled to the optional monitor 1370. The monitor 1370 measures the intensity of the tapped optical signal, which may be used to determine a control signal that may be communicated to the attenuators 1340 and/or the VOAs 1330 to adjust channel power levels. The output coupler 1365 of the OADM start-up node 1300 of FIG. 13 may comprise any well known optical couplers, such as a beam splitter, a tap and the like. In alternate embodiments of the present invention, the output coupler 1365 may comprise a novel multi-section optical coupler as described above and in U.S. patent application Ser. No. 10/378,411 entitled "Low-Loss Integrated Optical Coupler and Optical Switch" filed Mar. 03, 2003, which is herein incorporated by reference in its entirety.

Although the OADM start-up node 1300 of FIG. 13 is depicted as comprising an optional output coupler 1365 and an optional optical monitor 1370, alternate embodiments of the present invention do not comprise the output coupler 1365 and the optical monitor 1370. The added feature of measuring the intensity of the filtered tapped optical signal and using the measured intensity to determine a control signal that may be communicated to the attenuators 1340 and/or the VOAs 1330 to adjust channel power levels is not considered by the inventors as an essential feature of the present invention.

In alternate embodiments of the present invention, to increase the add/drop capacity of the OADM start-up node 1300 of FIG. 13, the attenuator $1340_1$ in the second separated optical path $1380_2$ may be replaced with a second WSC and a second star coupler. As evident from FIG. 13, the OADM start-up node 1300 is expandable without the disruption of the first 8-channel 200 GHz spaced optical band in the first separated optical path $1380_1$. The capacity of the OADM start-up node 1300 of FIG. 13 may be further increased by replacing the second optical path 1382 with an optical path similar to the first optical path 1381, including the two separated optical paths $1381_1$, $1381_2$ and the components located in those paths 13811, 13812. Similarly, the capacity of the OADM start-up node 1300 of FIG. 13 may be further increased by expanding any or all of the optical paths 1380 to include optical components as described above in the first and second optical paths 1381, 1382.

Figure 14:
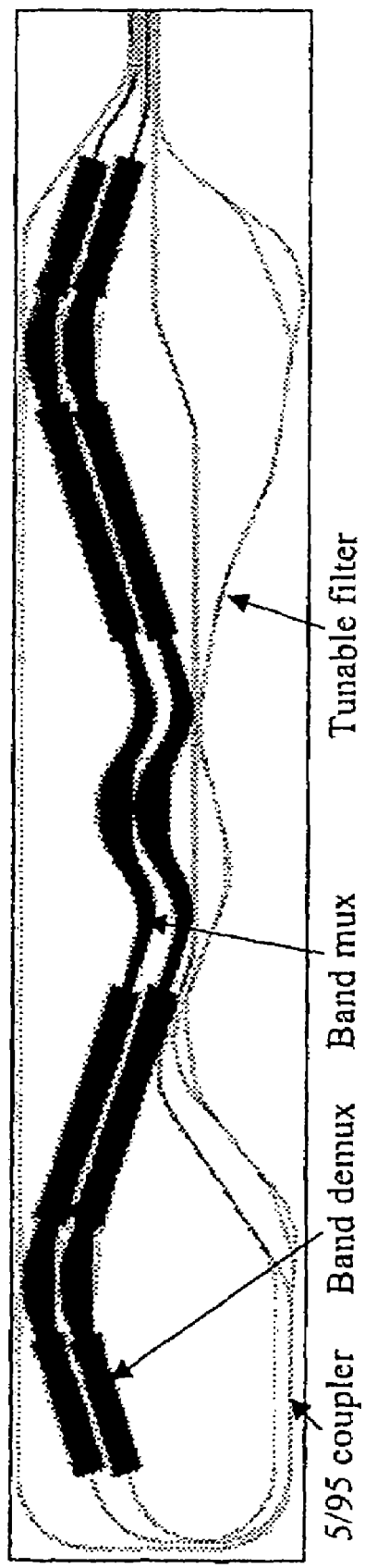
FIG. 14 depicts a more detailed diagram of the OADM start-up node of FIG. 13 in PLC technology.

In various embodiments of the present invention, to make the OADM start-up node 1300 low cost, the inventors integrate the de-interleaver 1310, the WSC 1315, the coupler 1320 having the VOAs 1330 and the interleaver 1350 onto one silica waveguide planar lightwave circuit (PLC) and the band demultiplexer 1305, band multiplexer 1360 and monitor 1370 onto a second PLC circuit. FIG. 14 depicts a more detailed diagram of the OADM start-up node 1300 of FIG. 13 in PLC technology. The inventive PLC OADM start-up node 1300 proposed by the inventors comprises a small form factor such that at least three PLC OADMs are capable of being constructed out of a 5-inch silica wafer.

In alternate embodiments of the present invention, the band filters of the present invention (e.g., the band demultiplexer and the band multiplexer) are a novel arrangement of two substantially perfectly sampled waveguide grating routers (WGRs). Such band filters are described in a commonly assigned patent application, entitled "INTEGRATED BAND FILTER USING WAVEGUIDE GRATING ROUTERS" submitted by Christopher Doerr and assigned to Lucent Technologies, which is herein incorporated by reference in its entirety.

In alternate embodiments of the present invention, the optional optical monitor of the present invention is a novel arrangement requiring only a single fiber-coupled photodetector. Such an optical monitor is described in a commonly assigned patent application, entitled "Integrateable Optical Monitor" submitted by Christopher Doerr and assigned to Lucent Technologies, which is herein incorporated by reference in its entirety.

Briefly stated, in this embodiment of the present invention, after exiting the band multiplexer, a portion of the spectrum is tapped by a coupler of the present invention and optically coupled to the monitor of the present invention. In the monitor, the portion of the spectrum tapped by the coupler propagates through a scanning tunable filter consisting of a plurality of incoherently coupled thermooptically-tuned MZI filters with an exponential distribution of free-spectral range from at least 200 to 12800 GHz. The optical signal reflects off a fiber-coupled Faraday rotator mirror, passes again through the tunable filter (significantly improving resolution, extinction ratio, and polarization dependence), passes through the coupler again, and subsequently, the filtered spectrum is measured by a photodetector.

Although the concepts of the present invention herein have been described with respect to various embodiments of interleavers comprising two multi-section optical couplers comprising three substantially similar optical couplers, it should be noted that the specific interleavers are simply provided as embodiments of the present invention and should not be treated as limiting the scope of the invention. It will be appreciated by one skilled in the art informed by the teachings of the present invention that the concepts of the present invention may be applied in interleavers comprising a single multi-section optical coupler or a plurality of multi-section optical couplers each comprising other numbers of substantially similar optical couplers.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An optical device, comprising:
 a Y-branch input coupler comprising at least one input port and at least two branches;
 a Mach-Zehnder interferometer (MZI) in optical communication with said Y-branch coupler; and
 an output multi-section optical coupler comprising at least two substantially similar optical couplers, adjacent ones of said optical couplers interconnected via at least one set of waveguides, each of said sets of waveguides comprising a path-length difference between the waveguides therein;
 wherein said optical device comprises at least two arms, each of said arms comprising at least one output port, and includes means for causing portions of an input signal traversing said at least two arms to undergo a relative phase shift, such that an output signal is split between the output ports of said optical device.

2. The optical device of claim 1, further comprising a plurality of parallel Y-branch segments transversely intersecting the at least two branches of said Y-branch input coupler.

3. The optical device of claim 2, wherein said plurality of Y-branch segments comprise segments of waveguide with substantially constant center-to-center spacing and gradually decreasing widths as their distance from the Y-branch input increases.

4. The optical device of claim 1, wherein said MZI comprises two arms, each of said arms comprising a means for generating at least a portion of said phase shift.

5. The optical device of claim 4, wherein said means for generating a phase shift comprises phase shifters.

6. The optical device of claim 1, wherein said multi-section output coupler comprises two evanescent couplers, said evanescent coupler closest to the Y-branch comprising a coupling ratio of 100/0 and the second evanescent coupler comprising a coupling ratio of 50/50, wherein said two evanescent couplers have a 120-degree differential phase shift between them.

7. The optical device of claim 1, wherein said multi-section output coupler comprises three evanescent couplers, each of said evanescent couplers comprising a 50/50 coupling ratio.

8. The optical device of claim 1, wherein said optical device is used as an optical switch, such that said output signal is output via only one of said output ports at a time.

9. The optical device of claim 1, further comprising a means for causing a phase shift located within at least one of said waveguides of each of said sets of waveguides, wherein said path-length differences are adjusted by altering the relative phases between said waveguides of said sets of waveguides using said means for causing a phase shift.

10. The optical device of claim 1, wherein said optical device is constructed in planar waveguide technology.

* * * * *